United States Patent
Chrobak et al.

(10) Patent No.: US 6,722,991 B2
(45) Date of Patent: Apr. 20, 2004

(54) VENTING SYSTEM AND METHOD FOR A DRIVESHAFT

(75) Inventors: Lou J. Chrobak, Troy, MI (US); Maciej Glowacki, West Bloomfield, MI (US); Walter J. Golembiewski, Washington, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 8 days.

(21) Appl. No.: 10/025,024

(22) Filed: Dec. 19, 2001

(65) Prior Publication Data

US 2002/0132669 A1 Sep. 19, 2002

Related U.S. Application Data

(60) Provisional application No. 60/276,429, filed on Mar. 15, 2001.

(51) Int. Cl.[7] ................................................ F16C 3/00
(52) U.S. Cl. ........................................ 464/17; 464/134
(58) Field of Search ........................... 464/16, 17, 134; 137/517, 854; 403/31, 32

(56) References Cited

U.S. PATENT DOCUMENTS

| | | | |
|---|---|---|---|
| 1,541,007 A | | 6/1925 | Thiemer |
| 1,949,500 A | * | 3/1934 | Swenson ............... 464/134 X |
| 1,950,579 A | * | 3/1934 | Swenson ............... 464/134 X |
| 2,510,362 A | | 6/1950 | Anderson |
| 2,769,457 A | * | 11/1956 | Wittenberg ............. 137/854 X |
| 3,063,266 A | | 11/1962 | Rabson |
| 3,454,182 A | * | 7/1969 | Morton .................... 137/517 X |
| 3,813,899 A | | 6/1974 | Abrahamer |
| 3,942,336 A | | 3/1976 | Schultenkamper |
| 4,003,219 A | | 1/1977 | Stull |
| 4,084,536 A | | 4/1978 | Stansbury |
| 4,153,260 A | | 5/1979 | Joyner |
| 4,215,869 A | | 8/1980 | Pendleton |
| 4,308,729 A | * | 1/1982 | Condon .................... 464/16 |
| 4,416,445 A | * | 11/1983 | Coad .................... 137/854 X |
| 4,460,182 A | | 7/1984 | Brissette |
| 4,508,522 A | * | 4/1985 | Numazawa et al. ........ 464/11 |
| 4,516,959 A | | 5/1985 | Krude |
| 4,529,213 A | | 7/1985 | Goodman |
| 4,582,484 A | | 4/1986 | Sandor |
| 4,819,755 A | | 4/1989 | Smemo et al. |
| 4,895,391 A | | 1/1990 | Groat |
| 4,945,745 A | | 8/1990 | Bathory et al. |

(List continued on next page.)

FOREIGN PATENT DOCUMENTS

| | | | | |
|---|---|---|---|---|
| DE | 1 475 963 | * | 7/1969 | ............ 137/854 |
| FR | 1.237.637 | * | 6/1960 | ............ 137/517 |
| FR | 1.417.355 | * | 10/1965 | ............ 137/854 |

*Primary Examiner*—Greg Binda
(74) *Attorney, Agent, or Firm*—Brinks Hofer Gilson & Lione

(57) ABSTRACT

Venting systems and methods are provided for a splined driveshaft to continually equalize the internal driveshaft pressure with that of the atmosphere, preventing at the same time, external elements, such as, water, dirt, or salt from getting into the driveshaft, thereby causing premature wear or corrosion. One venting system comprises a vent defined in a splined driveshaft for allowing air outside the driveshaft, containing telescopically resident first and second members, to pass into at least one of the first and second members, and a plug mounted over the vent. Another venting system comprises a weld yoke at an end of a splined driveshaft, a vent defined in the weld yoke allowing air outside the splined driveshaft to pass into the driveshaft, and a plug mounted over the vent. A venting method comprises providing a splined driveshaft, forming a vent defined in the splined driveshaft, mounting a plug over the vent, and venting the splined driveshaft through the vent.

6 Claims, 6 Drawing Sheets

U.S. PATENT DOCUMENTS

| | | |
|---|---|---|
| 4,957,459 A | 9/1990 | Snyder |
| 5,027,784 A * | 7/1991 | Osawa et al. ........... 137/854 X |
| 5,230,658 A | 7/1993 | Burton |
| 5,299,982 A | 4/1994 | Burton |
| 5,342,282 A | 8/1994 | Letourneur |
| 5,419,741 A | 5/1995 | Schwärzler |
| 5,525,112 A | 6/1996 | Smith |
| 5,655,968 A | 8/1997 | Burton |
| 5,716,276 A * | 2/1998 | Mangas et al. ......... 464/134 X |
| 5,752,866 A | 5/1998 | Takahashi et al. |
| 5,772,520 A | 6/1998 | Nicholas et al. |
| 5,836,824 A | 11/1998 | Konegen et al. |
| 5,845,911 A | 12/1998 | Gimino |
| 5,904,622 A | 5/1999 | Breese et al. |
| 5,931,738 A | 8/1999 | Robb |
| 5,961,388 A | 10/1999 | Breidenbach et al. |
| 6,023,830 A | 2/2000 | Cole et al. |
| 6,123,622 A | 9/2000 | Mikeska et al. |
| 6,159,104 A | 12/2000 | Mikeska et al. |
| 6,179,717 B1 | 1/2001 | Schwärzler |
| 6,193,612 B1 | 2/2001 | Craig et al. |
| 6,195,991 B1 | 3/2001 | De Shon |
| 6,279,221 B1 | 8/2001 | Glowacki et al. |
| 6,516,829 B1 * | 2/2003 | Townsend et al. ...... 137/854 X |

* cited by examiner

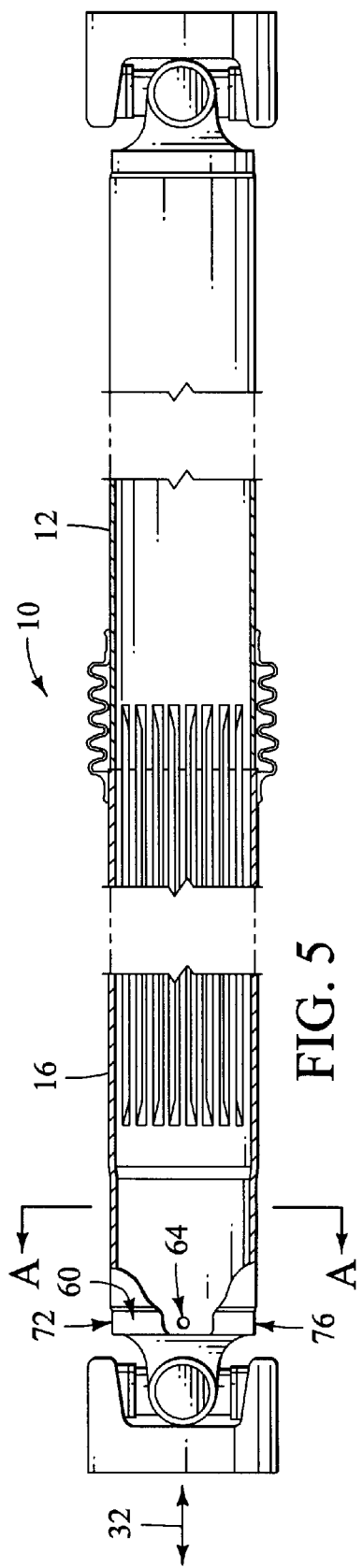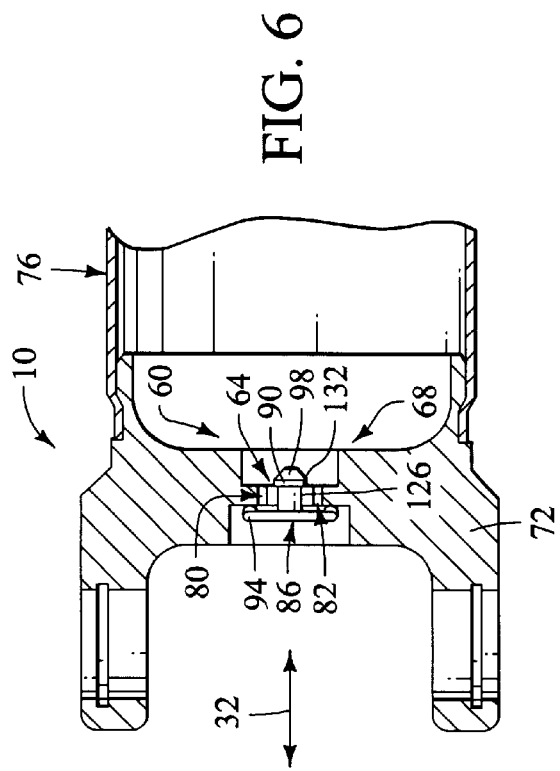

US 6,722,991 B2

VENTING SYSTEM AND METHOD FOR A DRIVESHAFT

RELATED APPLICATIONS

This application claims priority to U.S. Provisional Patent Application No. 60/276,429, filed Mar. 15, 2001, the entirety of which is hereby incorporated herein by reference.

BACKGROUND OF THE INVENTION

This invention relates generally to a venting system and method for use in a double-tube "slip-in-tube" driveshaft. The concept of a double-tube "slip-in-tube" splined driveshaft is relatively new.

Applicant owns U.S. Pat. No. 6,279,221 ("the '221 patent"), issued Aug. 28, 2001, for a double-tube "slip-in-tube" vehicle driveshaft, which is hereby incorporated in full by reference. A double-tube "slip-in-tube" splined driveshaft comprises first and second members each having splined portions. The second member is telescopically resident within the first member, and the splined portion of the first member cooperates with the splined portion of the second member. In such manner, the first and second members cooperatively form the driveshaft. The cooperating splined portions of the first and second members allow external elements to protrude into the double-tube splined driveshaft at the location of the intermeshing splines.

A slip-in-tube driveshaft contains, depending on diameter and length, 8 to 16 liters of air sealed inside it during assembly. Driveshaft working temperature varies continuously depending on ambient temperature, driving conditions, momentary torsional load, and depth and frequency of driveshaft plunging action. Those temperature changes affect the internal air pressure inside the driveshaft tube. In addition, the air column inside the tube experiences compression and decompression by reversing, at various frequencies, plunging motions of the driveshaft. Those factors cause, at certain frequencies, the air column inside the tube to vibrate and resonate within the shaft, thereby creating driveshaft noise and boom. This can be a potentially serious problem by degrading driveline noise, vibration, and harshness (NVH) performance. In addition, the air inside the tube can create hydraulic lock, impeding plunging action, and also resisting manual driveshaft length adjustment for its installation during vehicle final assembly. This can make the installation of the shaft difficult.

Venting is necessary to continually equalize the internal driveshaft pressure with that of the atmosphere. At the same time, it is necessary to prevent external elements, such as water, dirt, or salt, from entering the interior of the driveshaft, thereby causing premature wear or corrosion.

BRIEF SUMMARY OF THE INVENTION

It is in general an object of the invention to provide a venting system and venting method for a double-tube "slip-in-tube" splined driveshaft.

In one aspect, this invention provides a venting system for a driveshaft, wherein the driveshaft comprises first and second members each having splined portions, the second member is telescopically engaged with the first member, and the splined portion of the first member cooperates with the splined portion of the second member thereby allowing the first and second members to cooperatively form the driveshaft. The venting system comprises at least one vent defined in the driveshaft for allowing air outside the driveshaft to pass into at least one of the first and second members, and a plug mounted over at least one vent defined in the driveshaft.

In another aspect, this invention provides a venting system for a splined driveshaft comprising a weld yoke at an end of the splined driveshaft, at least one vent defined in the weld yoke allowing air outside the splined driveshaft to pass into the splined driveshaft, and a plug mounted over at least one vent.

In yet another aspect, this invention provides a method of venting a splined driveshaft. The method comprises providing a splined driveshaft, forming at least one vent defined in the splined driveshaft, mounting a plug over at least one vent in the splined driveshaft, and venting the splined driveshaft through at least one vent.

The present invention, together with further objects and advantages, will be best understood by reference to the following detailed description taken in conjunction with the accompanying drawings.

BRIEF DESCRIPTION OF SEVERAL VIEWS OF THE DRAWINGS

FIG. 5 is an assembled side view of the driveshaft shown in FIG. 1 incorporating the venting system of the present invention;

FIG. 6 is a cut-away top view of the venting system driveshaft of FIG. 5, taken along view line A—A;

DETAILED DESCRIPTION OF THE INVENTION

Figure 1:
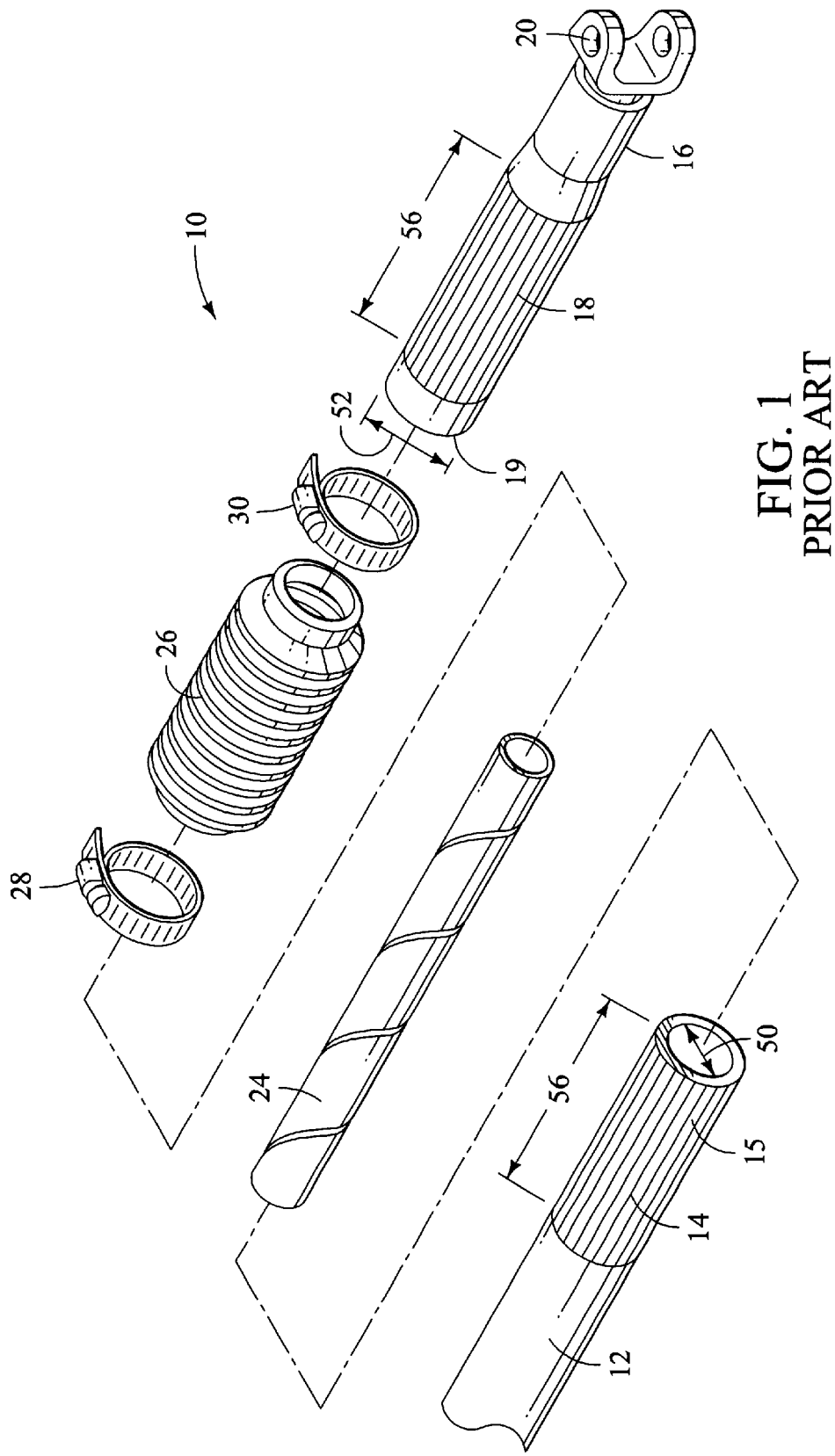
FIG. 1 is an unassembled perspective view of the prior art, for a two-piece slip-in-tube vehicle driveshaft, as shown in the '221 patent.

Applicant owns U.S. Pat. No. 6,279,221 ("the '221 patent"), issued Aug. 28, 2001, for a double-tube "slip-in-tube" vehicle driveshaft, which is hereby incorporated in full by reference.

Referring to the drawings, FIGS. 1–4 have been incorporated from the '221 patent for a double-tube "slip-in-tube" vehicle driveshaft. As shown, a double-tube "slip-in-tube" vehicle driveshaft 10 includes a generally round and/or tubular, generally hollow first member 16 having a splined portion 18 which is circumferentially formed upon an interior surface 19 of the first member 16. The driveshaft 10 further includes a second generally round and/or tubular, generally hollow member 12 having a splined portion 14 which is circumferentially formed upon an exterior surface 15 of the second member 12. The second member's splined portion 14 is adapted to selectively and cooperatively intermesh with the first member's splined portion 18. The first and second members 16, 12 may have various diameters 52, 50 which in one non-limiting embodiment are respectively equal to about approximately one and three-quarter (1.75) inches to about five (5.0) inches. Other larger diameter values may be utilized.

The second member 12 is adapted to selectively, movably, and telescopically penetrate the first member 16. The splined portions 18, 14 of the first and second members 16, 12 cooperatively intermesh in the usual and known manner. The first member 16 is coupled, by the use of a conventional flange 20, to a conventional transmission 21, while the second member 12 is coupled, by the use of a conventional flange 22, to a conventional differential 23. The torque, is communicated to the first member 16 and then, by use of the intermeshed splined portions 18, 14 of the first and second members 16, 12, is communicated to the second member 12. The cooperating splined portions 18, 14 allow the second member 12 to dynamically move along the longitudinal axis of symmetry 32 of the driveshaft 10 in response to changes in the distance between the transmission 21 and the differential 23, in a known manner.

Figure 2:
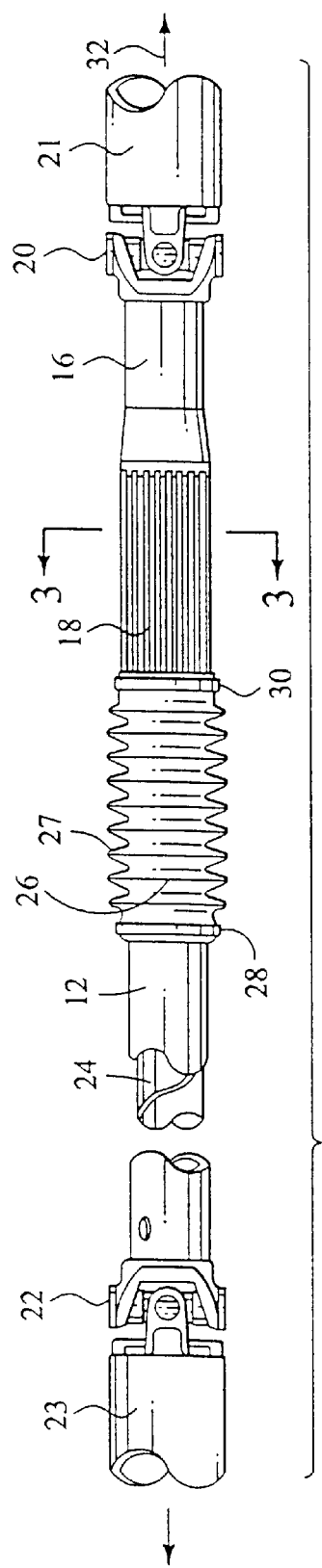
FIG. 2 is an assembled side view of the driveshaft shown in FIG. 1.

As further shown in FIGS. 1 and 2, the driveshaft 10 includes a substantially round and generally tubular shaped vibration dampening member 24, which is adapted to conform to the shape of the selectively and movably engaged members 12, 16 and which is removably and selectively placed within the assembled members 12, 16. Particularly, member 24 absorbs at least some of the vibrational energy which is generated by the operatively assembled members 12, 16. Member 24 maybe formed from conventional and commercially available cardboard and/or from a variety of other vibration dampening materials.

Also as seen in FIGS. 1 and 2, a rubber boot member 26 having several integrally formed and selectively expandable pleats 27 substantially covers the intermeshed portions 14, 18 and is clamped onto the driveshaft 10 by the use of a pair of substantially identical and commercially available generally circular clamps 28, 30. The boot member 26 selectively "slips" or "slides" over the splined portions 14, 18 in a manner shown. The cooperating splined portions 14, 18 of the first and second members 16, 12 also allow the second member 12 to dynamically move along the longitudinal axis of symmetry 32 of the driveshaft 10 in response to changes in the distance between the transmission 21 and the differential 23, in unknown manner.

The first and second members 16, 12 may be manufactured from conventional and commercially available lightweight aluminum material which may comprise a commercially available "6061-T4" type of aluminum or aluminum alloy material. The splines are "cold formed" upon the surfaces 19, 15 by the use of the conventional "Grob" process, which is provided by the Ernst Grob AG company of Mannedorf, Switzerland. Moreover, the splined portions 18, 14 of the first and second members 16, 12 are selectively hardened or "anodized" in accordance with the commercially available Metalast anodizing process which is provided by the Metalast International corporation of Minden, Nev. More particularly, the splined portions 18, 14 of the first and second members 16, 12, in one embodiment, are anodized with a layer of "Metalast hardcoat" material having a thickness of about 0.002".

Figure 4:
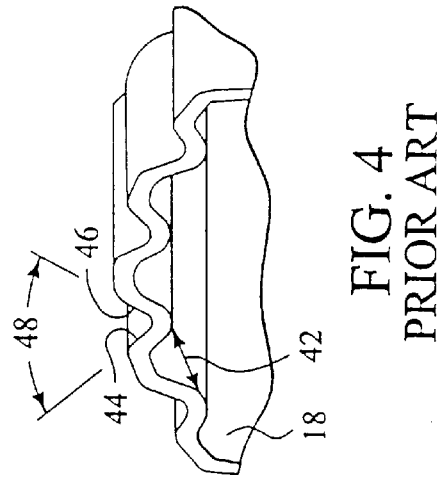
FIG. 4 is a fragmented perspective view of the portion of the driveshaft which is shown in FIG. 3 and which illustrates portions of the splines, which are used and/or selectively formed, upon the vehicle driveshaft of a preferred embodiment.
Figure 3:
FIG. 3 is a side view of the driveshaft shown in FIG. 2, taken along view line 3—3.

The use of such anodized aluminum and cold-formed splined portions 18, 14 allows for a relatively lightweight driveshaft 10 which substantially reduces the amount of vibration and noise which emanates from the operatively formed driveshaft 10. The relatively lightweight aluminum construction allows the first and second members 16, 12 to have relatively large diameters 52, 50, while providing a significant decrease in the overall weight relative to prior driveshafts. These relatively large diameters members 16, 12 efficiently distribute the applied axial loads over a larger surface area, thereby allowing the driveshaft 10 to support relatively larger torques at relatively higher speeds than prior driveshaft assemblies. Further, this relatively lightweight design allows for relatively long splined portions 18, 14 which, in one embodiment may have a substantially identical length 56 equal to at least and approximately three times the diameter 52 of the first member 16 (e.g., approximately 13.5 inches). In other non-limiting embodiments, the splined portions 18, 14 have lengths which respectively extend approximately half way along the first and second members 16, 12 or have respective lengths equal to approximately three times their respective diameter. The anodized aluminum splines also, as is best shown in FIGS. 3 and 4, allow for relatively large and/or wide splined mating surfaces and/or "working areas" (e.g., which in one non-limiting embodiment have a "tooth thickness" 42 equal to about five to about ten millimeters). These wide splines allow for better distribution of the axial loads imparted upon the spine portions 18, 14 and are effective to reduce the overall wear of the splines and the assembly 10, thereby substantially increasing the "working" or "operating" life of the driveshaft 10.

In one non-limiting embodiment, each end wall 44, 46 of each spline cooperatively forms an angle 48 of about forty degrees (40°) to eighty degrees (80°), although other angular configurations may be utilized. Further, while a segment of the splined portion 18 of the first member 16 is shown in FIG. 3, it should be realized that the splined portion 14 of the second member 12 is substantially similar. It should be appreciated that these relatively long intermeshing portions 18, 14 reduce the amount of noise and/or vibrations generated from the driveshaft 10. Additionally, these relatively long splined intermeshing portions 18, 14 reduce the probability that the driveshaft 10 will undesirably buckle in a collision, thereby increasing the overall safety of the vehicle. Further, these relatively lightweight first and second members 16, 12 having relatively long respective splined portions 18, 14, allow for the creation of a relative stiff and lightweight driveshaft. In one embodiment, the use of such a driveshaft may replace and/or substantially shorten the elongated transmission extension member 21.

The prior art driveshaft 10, as shown in FIGS. 1–4, contains sealed air inside the hollow driveshaft members 12, 16 with no venting means. As a result, the sealed air inside the hollow driveshaft members 12, 16 of the driveshaft 10 undergoes extreme changes in pressure during compression and decompression plunging motions of the driveshaft 10. To alleviate this problem, a venting system was needed to equalize the pressure inside the driveshaft 10 with that of the atmosphere.

Figure 7:
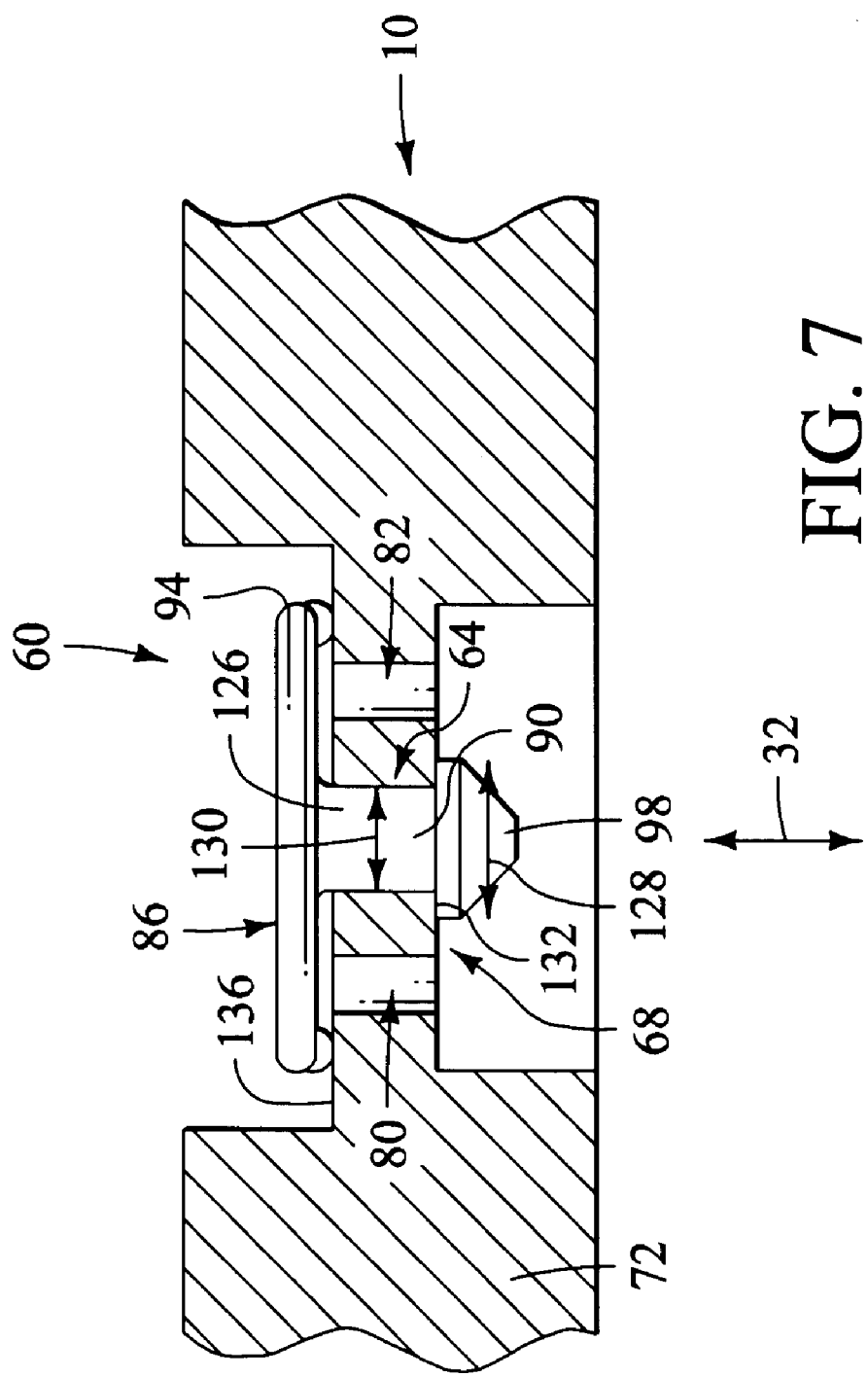
FIG. 7 is an enlarged cut-away top view of the venting system driveshaft of FIG. 5, taken along view line A—A.

FIGS. 5–7 show the venting system 60 of the instant invention installed on the embodiment of the two-piece slip-in-tube vehicle driveshaft 10 described above. In a preferred embodiment, the venting point 64 is located at an end 68 of a weld yoke 72 attached to an end 76 of one of the driveshaft members 12, 16. In alternative embodiments, there may be more than one venting point, for example by having separate venting points located at the ends of the respective yokes at the ends of each driveshaft member. In other embodiments, the venting point 64 may be located directly in the ends of either of the driveshaft members 12, 16. Preferably, the venting point 64 is aligned along the longitudinal axis of symmetry 32 of the driveshaft 10. In a preferred embodiment, the driveshaft venting occurs at the venting point 64 through two vents 80, 82 defined through the weld yoke 72. In other embodiments, a varying number of vents may be utilized. Further, the vents may be defined through one or more of the driveshaft members themselves. The vents may be formed in a variety of ways such as through drilling or molding. In a preferred embodiment, the vents 80, 82 are capped by a single removable plug 86, which is of an elastomeric material such as rubber, and is preferably shaped as described below. In alternative embodiments, more than one plug may be used.

Figure 10:
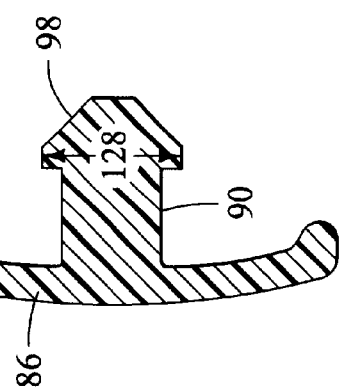
FIG. 10 is a cut-away side view of the embodiment of FIG. 8, taken along view line B—B.
Figure 9:
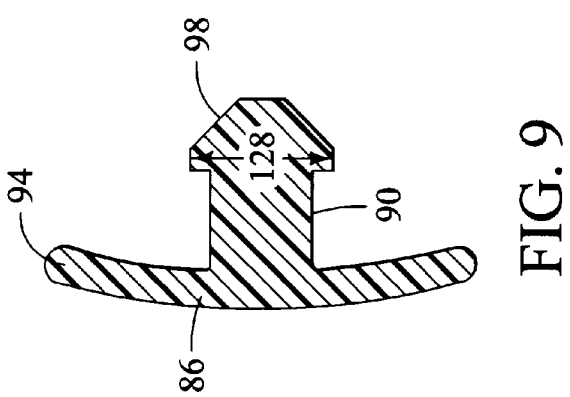
FIG. 9 is a cut-away side view of the embodiment of FIG. 8, taken along view line A—A.
Figure 8:
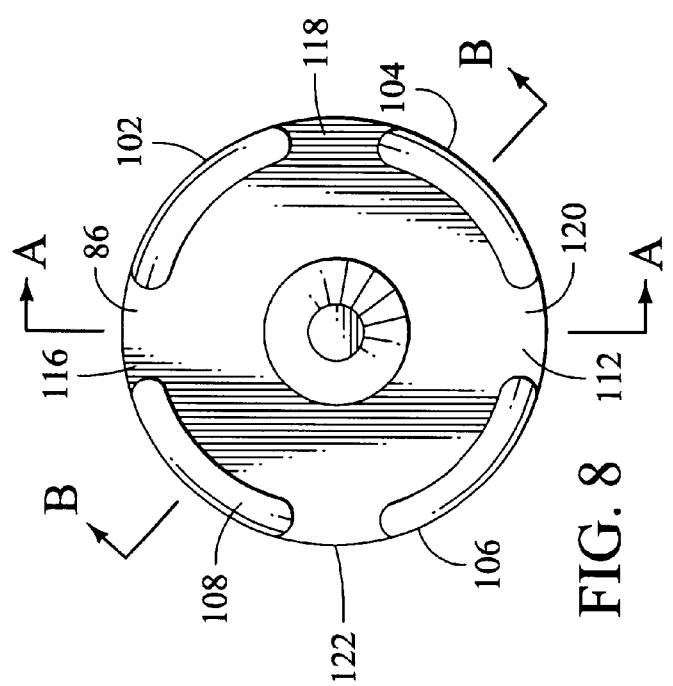
FIG. 8 is a bottom view of the venting system of the present invention.

As shown in FIGS. 8–10, the plug 86 has a stem portion 90 extending in a generally axial direction and an end portion 94 extending in a generally radial direction. Preferably, the stem portion 90 is generally cylindrical, and the end portion 94 is curved inwardly towards the stem 90 in a generally parabolic shape. In other embodiments, the stem portion may be other shapes such as rectangular or polygonal. Preferably, an end 98 of the stem portion 90 protrudes radially outwardly beyond the stem. The radially extending end portion 94 is preferably generally cylindrical. Four generally annularly extending cap portions 102, 104, 106, 108, arranged partially around various segments of the circumference of the outer edge 112 of the radially extending end portion 94, extend axially from the end portion 94. In other embodiments a varying number of cap portions may be used in correspondence with the appropriate number of vents. Venting crevices 116, 118, 120, 122, are defined in the cap portions 102, 104, 106, 108, at the segments of the circumference of the outer edge 112 of the end portion 94 where the cap portions 102, 104, 106, 108 are not arranged. In other embodiments, the venting crevices may be formed at different locations on the plug 86, such as around the end portion 94, and a varying number of venting crevices may be utilized.

As shown in FIGS. 6–7, in a preferred embodiment, the vents 80, 82 defined in the weld yoke 72 are capped by inserting the stem portion 90 of the plug 86 into a corresponding generally axially extending opening 126 defined through an end of the weld yoke 72. The radially outwardly protruding end 98 of the stem portion 90, having a diameter 128 larger than the diameter 130 of the opening 126 defined through an end of the weld yoke 72, deforms and snaps into place after reaching the end 132 of the opening 126. In such a manner, the plug 86 may be mounted to the weld yoke 72. Other mechanisms of securing the plug may be utilized such as threadedly attaching the plug. Additionally, in alternative embodiments, plugs may be mounted over one or more corresponding openings defined through an end of one or more of the driveshaft members 12, 16.

Preferably, the stem portion 90 is inserted into the opening 126 under preload tension, whereby the elastomeric stem portion is manufactured to be slightly shorter in length than the length of the opening. As a result, the stem portion is forced to lengthen when its end 98 is snapped into place, resulting in a tight fit under tension. Once the plug 86 is in place, the end portion 94 extends beyond the vents 80, 82, thereby forming a cap over the vents 80, 82. At the same time, the ends of the cap portions 102, 104, 106, 108, arranged partially around various segments of the circumference of the outer edge 112 of the end portion 94, preferably fit flush against the end surface 136 of the weld yoke 72.

Driveshaft venting takes place through venting crevices 116, 118, 120, 122, defined in the cap portions 102, 104, 106, 108, in conjunction with the vents 80, 82. In operation, when the driveshaft members 12, 16 compress during a plunging motion of the driveshaft 10, the high-pressure air inside the members 12, 16 vents by passing through the vents 80, 82 and venting crevices 116, 118, 120, 122. As a result, the internal driveshaft pressure is equalized with that of the atmosphere by allowing the high-pressure air out of the driveshaft. Similarly, when the driveshaft members 12, 16 decompress during a reverse plunging motion of the driveshaft 10, the higher-pressure air of the atmosphere vents by passing through the venting crevices 116, 118, 120, 122 and vents 80, 82 into the driveshaft 10. Again, the internal driveshaft pressure is equalized with that of the atmosphere. In such a manner, the driveshaft venting continually equalizes the internal driveshaft pressure with that of the atmosphere. At the same time, external elements, such as, water, dirt, or salt is prevented from contaminating the driveshaft 10 due to the structure of the plug 86. In particular, most external elements are larger than the venting crevices 116, 118, 120, 122 and vents 80, 82, and therefore are not able to pass into the driveshaft 10. As a result, premature wear or corrosion is avoided.

Figure 11:
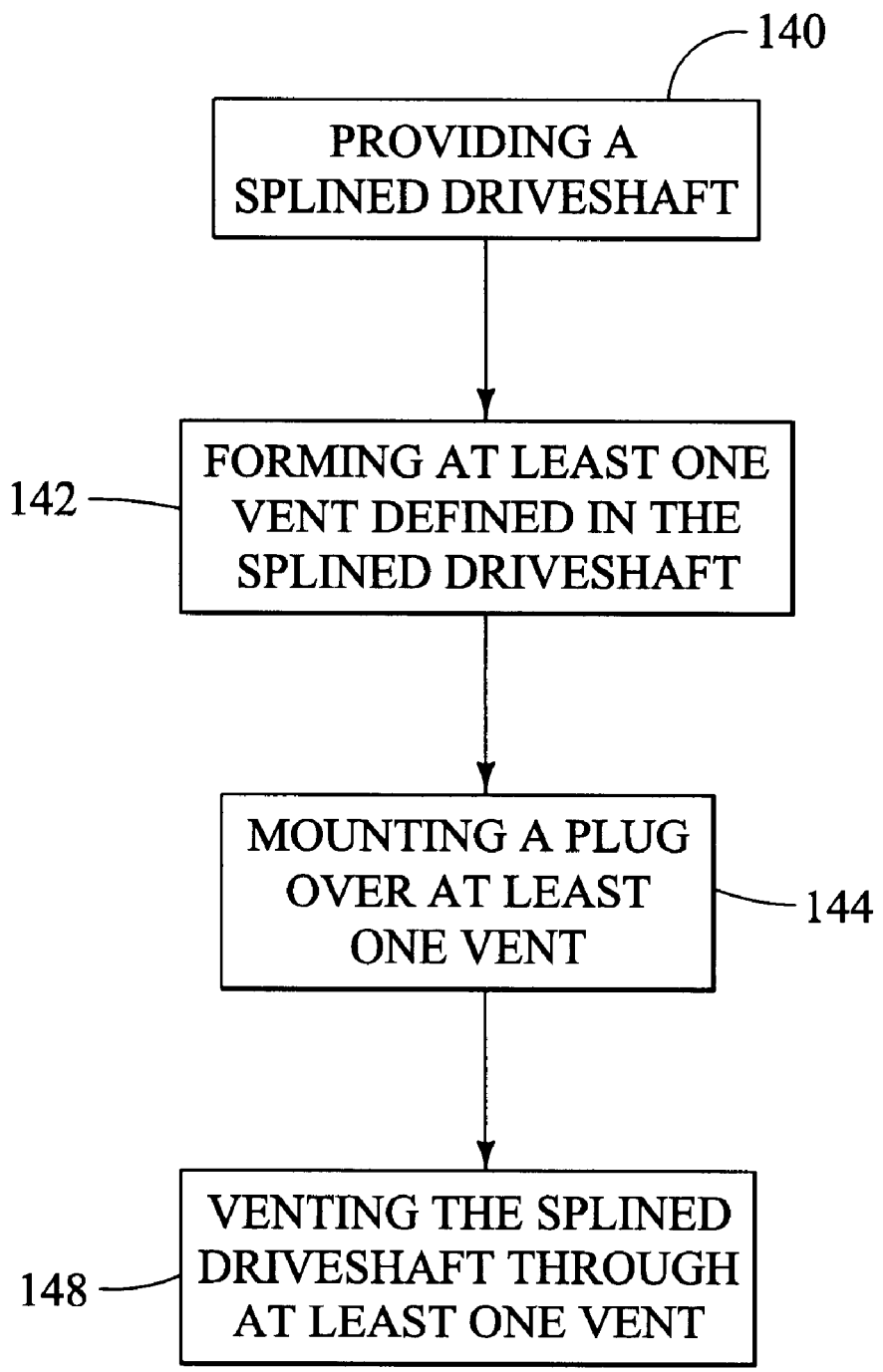
FIG. 11 is a flow diagram illustrating one exemplary method in accordance with the present invention.

As shown in FIG. 11, one method of venting is to first provide a splined driveshaft 140. The driveshaft preferably comprises first and second telescopically resident members having cooperating splined portions. Next, at least one vent is formed in the splined driveshaft 142. The one or more vents may be manufactured in a variety of ways such as through drilling or molding processes. Further, the one or more vents may be defined in one or more weld yokes attached to one or more ends of the first and second telescopically resident members, or may be defined in the ends of the members themselves. Next, a plug is mounted over at least one vent defined in the splined driveshaft 144. The plug is preferably interchangeable and can be easily replaced. Finally, the splined driveshaft is vented through at least one vent 148. The plug may be a variety of structures to facilitate venting. For example, the plug may include a molded ball valve. Similarly, the plug could comprise a stem portion extending in a generally axial direction, and one or more openings defined by the stem portion. The openings defined by the stem portion would vent the splined driveshaft by allowing air outside the splined driveshaft to enter it.

It is to be understood that the invention is not to be limited to the exact construction and/or method which has been illustrated and discussed above, but that various changes and/or modifications may be made without departing from the spirit and the scope of the invention.

What is claimed is:

1. A driveshaft assembly for a vehicle comprising:
   a shaft including first and second members each having splined portions, said second member being telescopically engaged with said first member, said splined portion of said first member cooperating with said splined portion of said second member thereby allowing said first and second members to cooperatively form the shaft, wherein said first member defines an opening and a vent, wherein said vent is located at a distance from said opening; and
   a plug including a stem portion located in said opening and an end portion extending over said vent, wherein said plug and said first member cooperate to define a venting crevice such that air outside said shaft may pass from outside said shaft, through the venting crevice, through the vent, and into said first member.

2. The driveshaft assembly of claim 1, wherein said second member is telescopically received within said first member.

3. The driveshaft assembly of claim 1, wherein the stem portion of said plug extends in a generally axial direction relative to said first and second members, and the end portion extends in a generally radial direction relative to said first and second members.

4. The driveshaft assembly of claim 3, wherein the stem portion of said plug is generally cylindrical.

5. The driveshaft assembly of claim 3, wherein said end portion defines a cap portion overlying said vent.

6. The driveshaft assembly of claim 5, wherein the venting crevice is defined in the cap portion of said plug.

* * * * *